United States Patent [19]

Carney et al.

[11] Patent Number: 4,509,585

[45] Date of Patent: Apr. 9, 1985

[54] ENERGY MANAGEMENT CONTROL SYSTEM

[75] Inventors: George T. Carney, Boardman, Ohio; Gary C. Heath, Hermitage, Pa.

[73] Assignee: Energy Control Products, Inc., Youngstown, Ohio

[21] Appl. No.: 569,203

[22] Filed: Jan. 9, 1984

[51] Int. Cl.³ .............................. F23N 5/20; H02J 1/00
[52] U.S. Cl. .................................. 165/12; 236/46 R; 307/39
[58] Field of Search ...................... 165/12; 236/46 R; 62/231; 307/39, 141.4

[56] References Cited

U.S. PATENT DOCUMENTS

| | | | |
|---|---|---|---|
| 3,948,438 | 4/1976 | Vlasak | 236/9 A |
| 4,199,023 | 4/1980 | Phillips | 165/12 |
| 4,292,813 | 10/1981 | Paddock | 165/12 X |
| 4,345,162 | 8/1982 | Hammer et al. | 307/39 |

Primary Examiner—William E. Wayner
Attorney, Agent, or Firm—Jacob Shuster

[57] ABSTRACT

The supply of energy in response to thermostat demand, to heating and cooling equipment is reduced by intermittent interruption during demand intervals and prolonged intermittently upon cessation of demand in accordance with the duration of such demand intervals pursuant to memory stored heating and cooling sequences of power interruption cycles. Sensors detect the presence and absence of energy demand to time the duration of the demand intervals and control the intermittent interruption in the supply of energy for energy saving purposes.

39 Claims, 7 Drawing Figures

ENERGY MANAGEMENT CONTROL SYSTEM

BACKGROUND OF THE INVENTION

This invention relates in general to the management of the supply of energy to energy consuming equipment and more particularly to an energy saving control system modifying the thermostatic control of energy supply to heating and cooling equipment for temperature regulated enclosures such as residential buildings.

The use of computer technology to control and regulate the supply of electrical energy to electrical loads in general and heating and cooling equipment in particular, is already well known. Such technology generally involves rather complex arrangements of temperature and other condition sensing inputs and timing information inputs that are processed, in accordance with stored programs to control power shedding as the overside switch on and switch off of the energy consuming loads. Also well known in the art are thermostatic controls for the gas valve coil and compressor contactor coil of heating and cooling equipment. Such thermostatic controls for residential heating and cooling equipment, for example, are necessarily compact and limited in its capability of reacting to the often conflicting factors involved in satisfying demand, accomodating equipment operating characteristics and avoiding the unnecessary expenditure of energy. While the use of the computer technology aforementioned to achieve a reduction in energy consumption without adversely affecting a satisfactory response to demand is possible, it is also obvious that extensive control system sophistication would be required including an expansion of sensor inputs at different locations and monitoring conditions other than temperature. Further, a considerable amount of installational adjustment may be required because of variables in connection with any sophisticated energy saving modification of a thermostatic building control system for heating and cooling equipment.

In connection with thermostatic control systems for heating and cooling equipment for buildings, it is already well known that the mere supply of electrical energy for operation of such equipment in response to and during closure of a thermostat switch is not satisfactory from the standpoints of comfort to the building occupants and operating efficiency. The heating or cooling capacities of such equipment necessarily exceed average demands in order to meet extreme external temperature or heat load conditions. As a result, excessive generation or absorption of heat often occurs during thermostat closure so as to create some discomfort during the open or off-time thermostat intervals. Attempts have been made to harvest the excess energy expended in such overheating or over-absorption of heat which produces temperature overshoot and discomfort. The reducing of thermostat on-time by use of programmed timers for such purposes has accordingly been proposed. However, the mere use of timing information does not take into account the many variables involved to even approach optimum results under most situations even if manual adjustment controls are provided.

It is therefore an important object of the present invention to provide an energy saving modification for a conventional type of thermostatic demand control system regulating operation of heating and cooling equipment which does not involve any expansion of condition sensing inputs or any economically prohibitive increase in costs of manufacture, installation and maintenance.

Yet another object of the invention in accordance with the foregoing object is to provide a thermostat control system for heating and cooling equipment that involves a simple manual selection of a heating or cooling operation in an energy saving mode or in the conventional mode of the thermostat control system.

Additional objects of the invention are to provide a thermostatic control system for heating and cooling equipment operationally modified by timing information to satisfy heating or cooling demands without discomfort caused by temperature overshoot or excessive heating or cooling.

SUMMARY OF THE INVENTION

In accordance with the present invention the periods of time during which a heat generator or a coolant compressor are switched on and off under control of the demand closing of thermostat switches, are modified without control or command from an external source, such as the power utility, in accordance with time-dependent programmed heating and cooling sequences of power interruption cycles stored in a programmable memory component of an energy management system. A mode selector through which either the heat generator or coolant compressor is enabled for operation in response to demand closing of a thermostat switch, also selects the heating or cooling sequence of cycles stored in the memory component for reducing and prolonging an intermittent supply of operative energy that is otherwise supplied under exclusive thermostat control.

All of the cycles of both the cooling and heating sequences have a constant duration of approximately 18 minutes. In response to closing of a thermostat switch, a cooling or heating sequence is initiated with a starting cycle at the end of which the memory component steps operation to the next cycle of the sequence in one of two directions dependent on the continued presence of energy demand or cessation of energy demand. Thus, if energy demand persists, more aggressive succeeding cycles occur with power-on intervals of progressively increasing duration while such power-on intervals progressively decrease in duration when energy demand ceases until the sequence of cycles is exhausted. Under the cooling sequence, switch-on of the compressor is delayed each cycle for an initial period of time, such as a minimum of four minutes, to protect the compressor against short cycling. Under the heating sequence, switch-off of the heat generator occurs at a frequency increasing during the presence of energy demand and decreasing in the absence of energy demand. The different operational characteristics of the cooling and heating equipment and the temperature controlling affect thereof is thereby accomodated with a savings in the energy otherwise consumed by conventional operation of such equipment in response to the energy demands of thermostat switch closing.

Control over the supply of operating energy in accordance with the aforementioned sequences of cycles is exercised through a load control component to which transistor switching signals are fed from the memory component thereby grounding a power converter through which an AC voltage source energizes the equipment controlling devices such as a burner gas valve coil and a compressor contactor coil. Current conducted through such coils is detected by sensors from which energy demand signals are fed to a timing section of the system for measuring the duration of and spacing between the closing of the thermostat switches through which the gas valve coil and the compressor contactor coil are energized. The timing information measured by the timing section is fed to the memory component under control of a control logic arrangement to effect readout of the aforementioned switching signals to the load control component in accordance with the duration of energy demand. A mode selector is connected to the thermostat control and the memory component. The mode selector includes a three position manual activator having one off position to permit conventional operation of the thermostat control and two operative positions to institute the energy saving operation of the system by disabling one of the coils and selecting the corresponding operational mode of the memory component. A switching voltage regulator associated with the power supply provides a pulsating DC operative voltage to the various components of the control system during both the load and noload conditions of the load control component.

BRIEF DESCRIPTION OF THE DRAWING FIGURES

The invention will be more fully understood and further advantages will become apparent when reference is made to the following detailed description of a preferred embodiment of the invention and the accompanying drawings in which.

DETAILED DESCRIPTION OF PREFERRED EMBODIMENT

Figure 1:
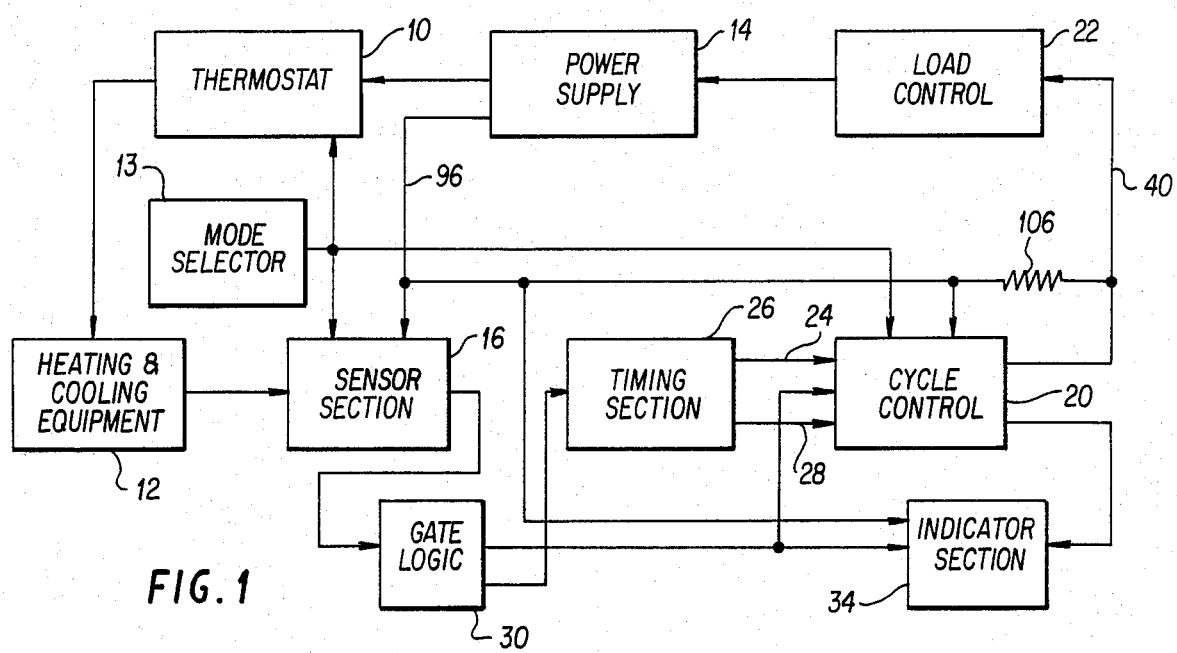
FIG. 1 is a block diagram schematically illustrating the control system of the present invention.

Referring now to the drawings in detail, FIG. 1 illustrates diagrammatically a thermostat 10 associated with heating and cooling equipment 12 as disclosed for example in U.S. Pat. No. 3,948,438 to Vlasak. Heating or a cooling operation for such equipment is usually selected through a three-position manual selector 13 while operating voltage from an available AC source is supplied through the thermostat to the heating and cooling equipment. In accordance with the present invention, the consumption of energy by the heating and cooling system is effectively and efficiently managed in response to energy demands of the thermostat 10, utilizing a sensor section 16 through which the presence or absence of energy demand is detected. In addition to conditioning the thermostat for selecting either the heating or the cooling operation, the mode selector 13 also conditions a programmed cycle control 20 for operation in either a heating or cooling mode to establish sequences of control cycles during which the supply of operating energy is intermittently interrupted through a load control 22 connected to the thermostat power supply 14. Programmed operation of the cycle control 20 is timed by the digital outputs 24 of a timing counter section 26 which also feeds digital outputs 28 to the cycle control 20 for the change in cycles during a heating or a cooling operation dependent on a demand signal output applied to the timing counter section 26 by the sensor section 16 through gate logic 30. The power interruption cycles of control 20 accordingly determine the duration and spacing between power-off intervals and are influenced by the duration and spacing between demand signals from the thermostat 10 detected by the sensor section 16. An output of the gate logic 30 resets the cycle control 20 and an indicator section 34 to which outputs are respectively fed from the power supply 14 and the cycle control 20. The indicator section is thereby effective to register the power on condition of the power supply and the off cycle intervals dictated by the output 40 of the cycle control 20 to the load control 22.

Figure 2A:
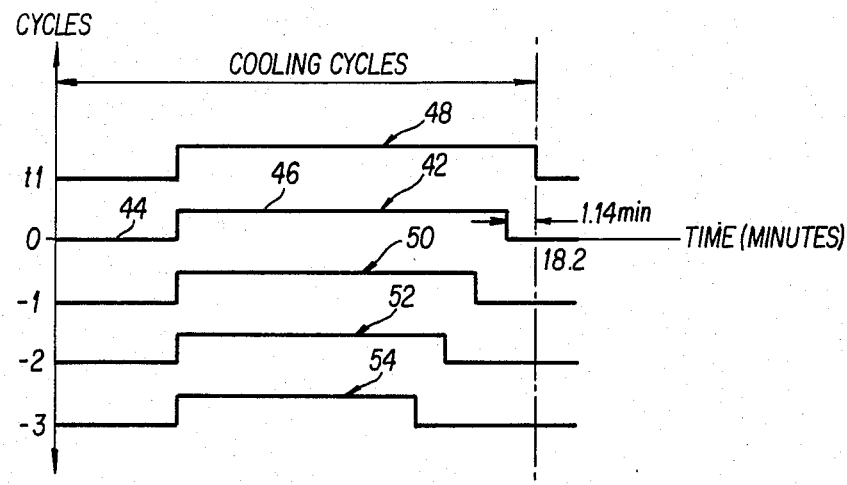
FIGS. 2A and 2B are timing diagrams illustrating the cooling and heating sequences of cycles underlying operation of the control system.
Figure 2B:
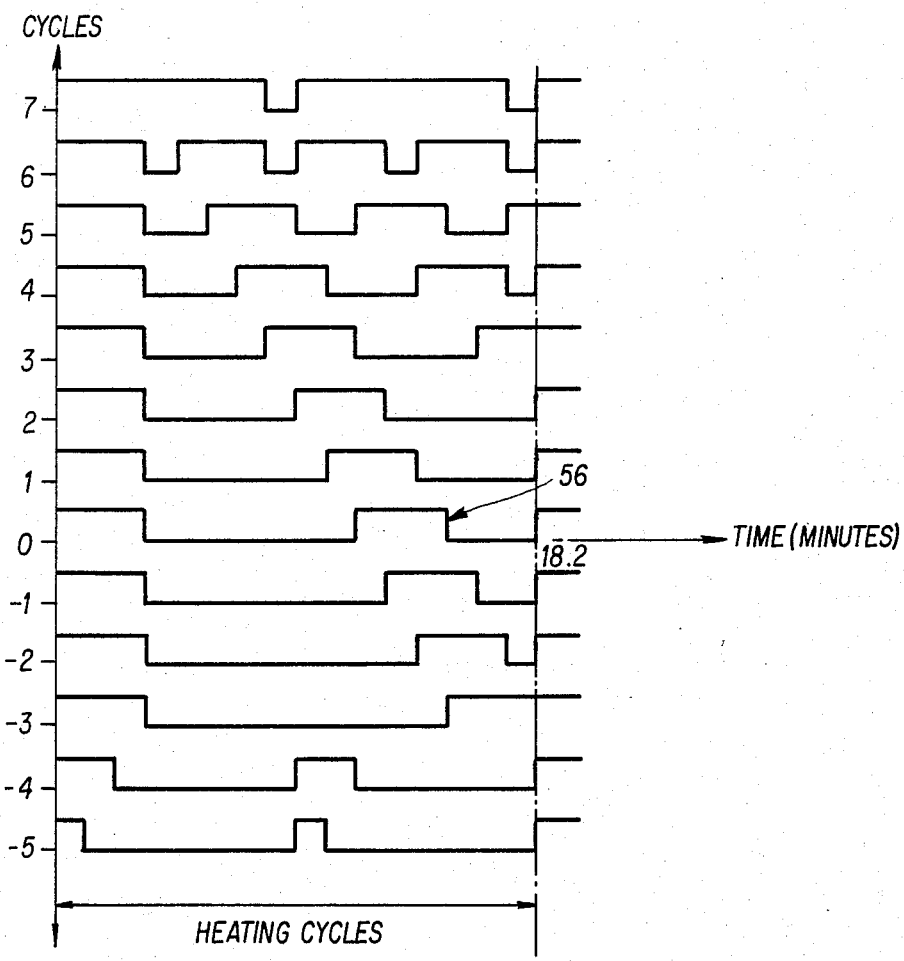

The timing diagrams of FIGS. 2A and 2B show two different sequences of power interruptive cycles, aforementioned in connection with the cycle control 20. When a demand signal is produced by the thermostat 10 to initiate a cooling operation, involving, for example, the energization of a coolant compressor of the air conditioning equipment, a starting cycle is established as represented by reference numeral 42. All cycles have a constant duration of 18.2 minutes. The starting cycle has an initial off interval 44 of 4.56 minutes duration that remains substantially constant for all cooling cycles to provide short cycling protection for the compressor which is being turned on and off. The starting cycle 42 also has a single power on interval 46 of a duration, such as 12.54 minutes. Upon completion of the starting cycle, the cycle control 20 steps to the next cycle 48 in one direction. Such change in cycle in the one direction occurs only if the sensor 16 continues to detect the presence of the demand signal from the thermostat 10. The cycle 48 is characterized by an increase in the duration of the power on interval by an incremental amount such as 1.14 minutes as depicted in FIG. 2A. The cycle 48 is repeated for successive steps in the same increasing direction of energy demand. If at any point during the step sequence the demand signal from the thermostat ceases, the next operational step change in cycle occurs in the opposite or demand decreasing direction until return to the starting cycle. Should the absence of the demand signal continue, a step change continues in the same demand decreasing direction producing incremental decreases in the duration of the power on interval as shown by cycles 50, 52 and 54 in FIG. 2A. Cycle 54 is repeated each successive step in the same decreasing direction of energy demand.

FIG. 2B shows the starting cycle 56 for a heating operation and the step change in the demand increasing and decreasing directions. In the starting cycle 56 of the heating sequence, there are two power-on intervals of 3.42 minutes durations spaced apart by 7.98 minutes. The spacing is incrementally decreased by one increment during each of the next six steps in the same demand increasing direction with an accompanying increase in the total duration of the power on intervals during the third through seventh steps. The cycle produced by the seventh step change is confined to two spaced power-on intervals. In the demand decreasing direction, the spacing between the two power on intervals of the starting cycle 56 increase during the next three steps without any change in the duration of the power on intervals. During the fourth and fifth steps in the demand decreasing direction the power on intervals are decreased in duration and the cycle is then repeated. Thus, the operational cycles control intermittent disabling of power supply and depend on the duration and spacing between the demand signals. These cycles vary in off time between 12½% to 87½% of the constant cycle duration as shown in FIG. 2B for a heating operation. During a cooling operation as shown in FIG. 2A, the off time duration per cycle varies between approximately 25% and 50%. Further, it will be apparent that for both the cooling and heating sequences, the power on intervals per cycle progressively increase or decrease in duration depending on the presence or absence of energy demand.

Figure 3:
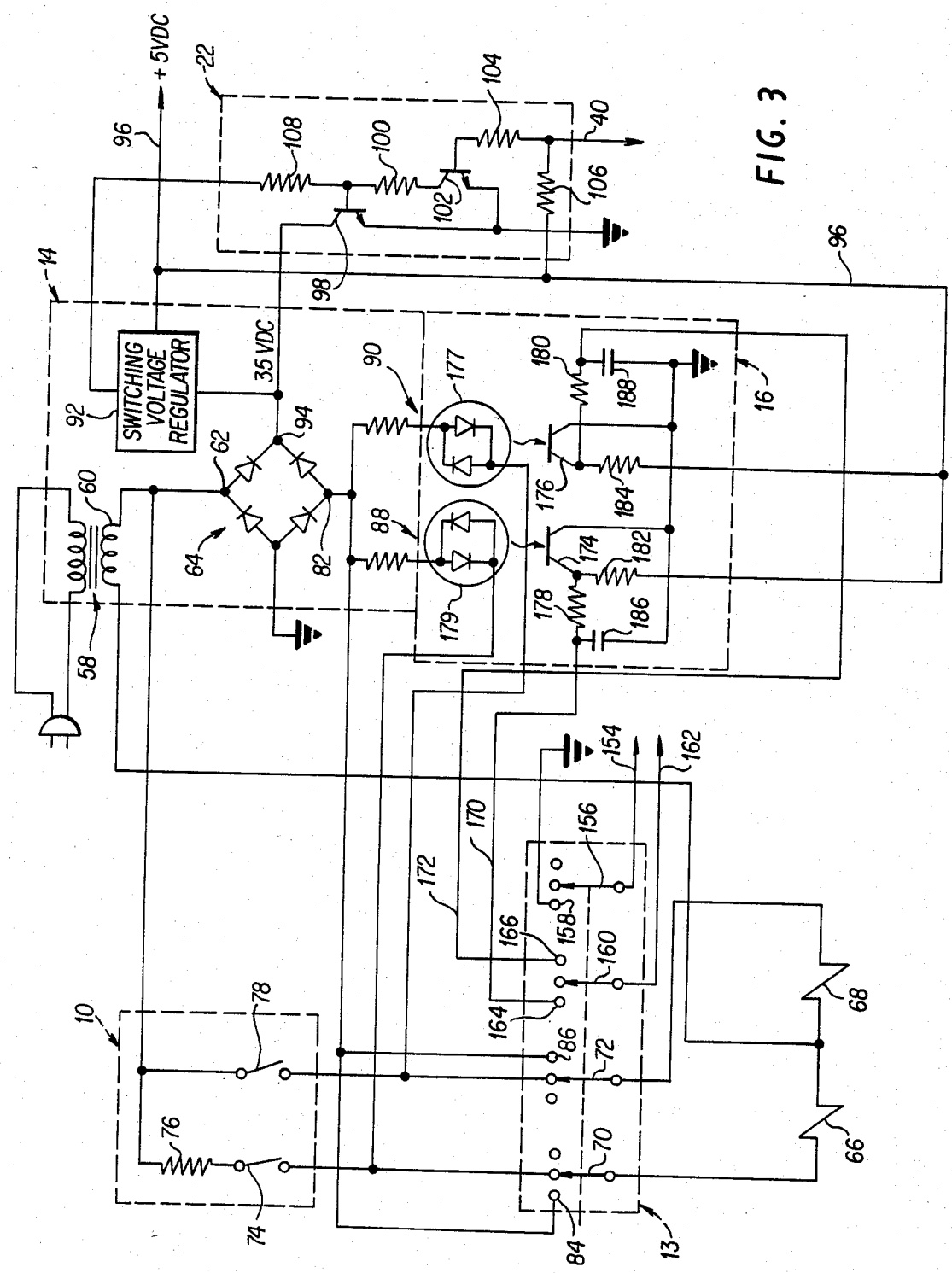

FIG. 3 shows the power supply 14 as including a transformer 58 having a primary winding adapted to be connected to a 110 VAC source to induce a 24 VAC output across its secondary winding 60. The secondary winding is connected to one input terminal 62 of a full wave, power converting rectifier 64 and to a pair of parallel connected energy controlling devices 66 and 68, such as the gas valve coil of gas heating equipment and the contactor coil of a compressor associated with air conditioning equipment. The coils 66 and 68 are respectively connected by the switches 70 and 72 of the mode selector 13 and the thermostat 10 across the secondary winding 60 for energization in response to energy demands to control operation of the heating and cooling equipment in a conventional manner when the mode selector is the "off" position as shown in FIG. 3. Thus, a heating demand signal is produced by current conducted through coil 66 upon closing of thermostat switch 74 in series with resistor 76 while a cooling demand signal is produced by current conducted through coil 68 upon closing of thermostat switch 78.

The other input terminal 82 of rectifier 64 is connected in parallel to the heating contact 84 of switch 70 and the cooling contact 86 of switch 72. In the heating position of mode selector 13, only coil 66 will be connected across the secondary winding 68 of the power input transfomer 58 in series with the rectifier 64 and the thermostat 10. Accordingly, only coil 66 is enabled for response to thermostat demand by closing of thermostat switch 74. Further, the coil 66 will then be connected in parallel with a resistor-diode network 88 between the rectifier 64 and the thermostat to limit the current conducted through coil 66 in response to thermostat demand. Similarly, in the cooling position of mode selector 13 only coil 68 is enabled to conduct current in response to demand closing of thermostat switch 78 in parallel with diode-resistor 90. As a result of such parallel paths through the diode-resistor networks, the coils 66 and 68 are deenergized when the rectifier 64 is unloaded, while coil energization in the conventional manner occurs when the mode selector is in the "off" position without adverse affect.

In addition to the transformer 58, rectifier 64 and diode-resistor networks 88 and 90, the power supply 14 includes a switching voltage regulator 92 to which the positive output terminal 94 of rectifier 64 is connected. The rectifier 64 is thereby loaded by regulator 92 to convert a relatively high rectified voltage of +35 VDC to a relatively low regulated voltage of +5 VDC on voltage line 96 for operating the various components of the invention. The regulator 92 maintains a pulsating DC voltage on line 96 during the intervals when the rectifier 64 is unloaded by the load control 22, as shown in detail in FIG. 3.

The load control 22 includes a load controlling transistor 98 having a collector connected to the output terminal 94 of rectifier 64 and an emitter connected to ground. Transistor 98 is switched to a conductive state to ground the rectifier by a signal voltage applied to the base through resistor 100 from the collector of a signal transmitting transistor 102. Transistor 102 has a grounded emitter and a signal input base coupled by resistor 104 to the signal output line 40 through which a low voltage bias is applied from voltage line 96 through resistor 106. The load controlling transistor 98 is normally maintained in a non-conductive state in the absence of a signal applied to the input base of transistor 102 by a bias voltage applied through resistor 108 and line 110 from the regulator 92.

Figure 4:
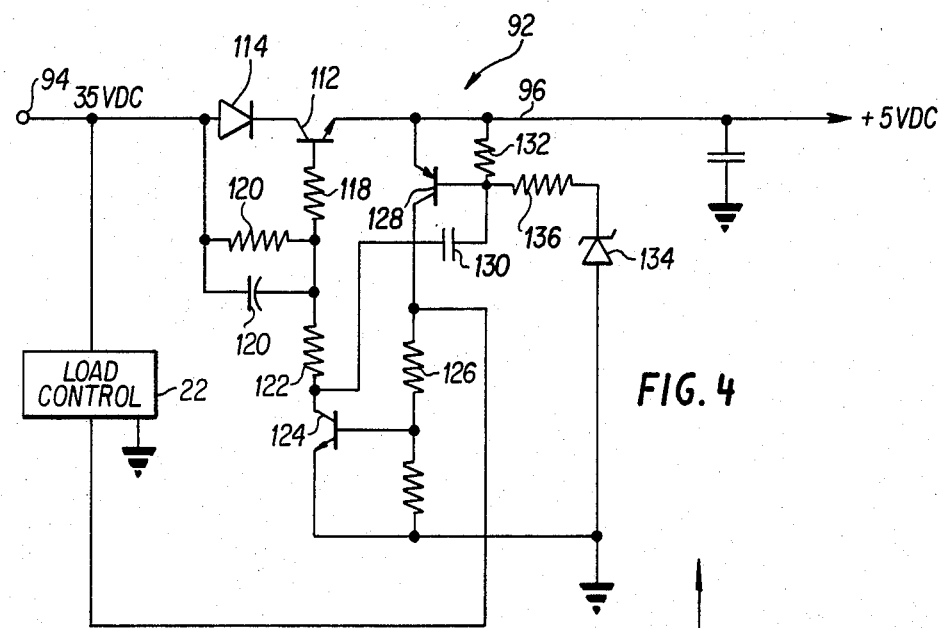
FIGS. 3, 4 and 5 are electrical circuit diagrams illustrating the control system in greater detail in accordance with one embodiment of the present invention.
Figure 6:
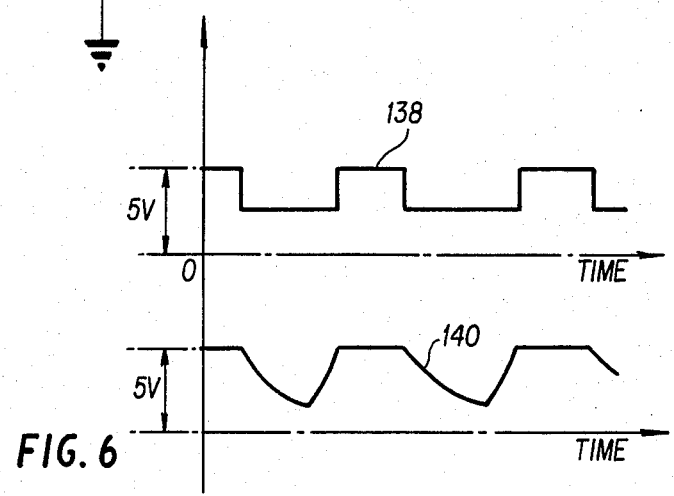
FIG. 6 is a graphical illustration of some voltage characteristics of the control system.

As shown in FIG. 4, the switching voltage regulator 92 has a switching transitor 112, the input collector of which is coupled by diode 114 to the output terminal 94 of the rectifier 64, and an output emitter connected to the output voltage line 96. Transistor 112 is switched on and off at a constant pulse rate by the charge and discharge of a capacitor 116 through base resistor 118. Capacitor 116 is connected in parallel with resistor 120 between terminal 94 and the junction of resistor 118 and a resistor 122 loading the collector of a signal synchronizing transistor 124 having a grounded emitter. A voltage regulating bias is applied to the base of transistor 124 through resistor 126 and through line 110 to the load control 22 as aforementioned, from a voltage regulative transistor 128. Transistor 128 has its emitter-collector circuit connected between lines 96 and 110 with base bias being controlled by capacitor 30 coupling the base to the collector of transistor 124. A bias resistor 132 connects the voltage line 96 to the base of transistor 128, the bias level of which is limited by grounded zener diode 134 connected in series with resistor 136 to the base. As a result of the foregoing circuit arrangement of the voltage regulator 92, a pulsating dc voltage 138 is maintained on line 96 under no-load conditions as indicated in FIG. 6. Under load conditions, a pulsating dc voltage 140 in phase with voltage 138 is established on line 96 as shown.

Figure 5:
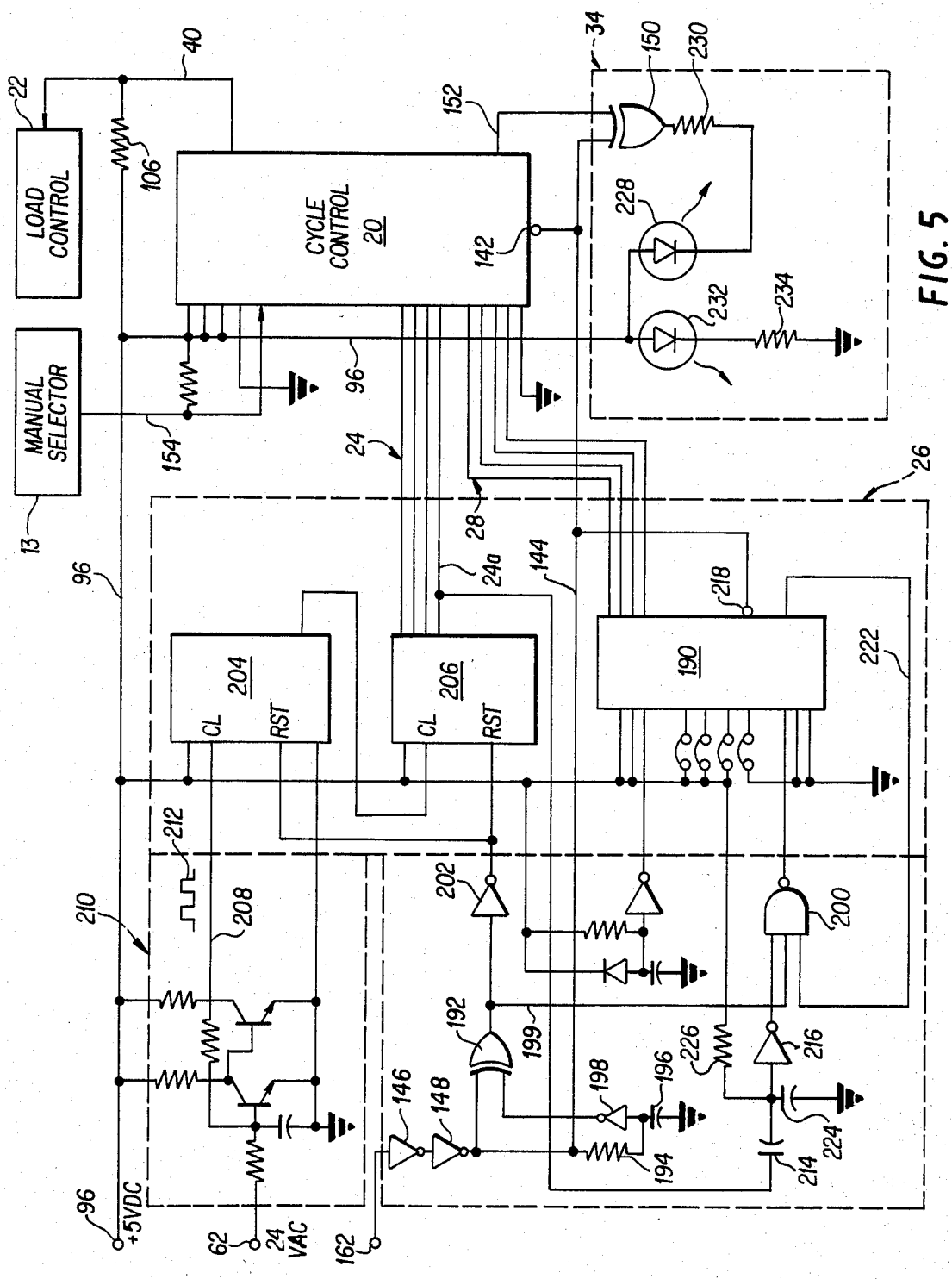

The signal output in line 40 to the load control 22, produces the power interrupting cycles as diagrammed in FIGS. 2A and 2B. Such cycles are obtained by programming the cycle control 20 which is in the form of a C-MOS, E-PROM computer chip as shown in FIG. 5 having four of its address input terminals connected to the data setting output 24 from the timing section 26 as aforementioned in connection with FIG. 1. Four input terminals of the cycle control chip 20 are connected to the other output 28 of the timing section. A reset terminal 142 of the cycle control chip is connected by reset line 144 to the sensor section 16 through the signal inverting Schmitt triggers 146 and 148 in the gate logic 30. Reset line 144 is also connected to one output of OR gate 150 associated with the indicator section 34. The other input of OR gate 150 is connected to one of the outputs 152 of the cycle control chip 20, another output of which is connected to the signal output line 40 aforementioned. The cycle control is normally operative to read out the cooling cycles 42, 50, 52, and 54 shown in FIG. 2A through output line 40. However, when input line 154 is grounded through the manual selector 13 in the heating position, the cycle control chip will output the heating cycles as shown in FIG. 2B. The cycles selecting input line 154 is accordingly connected to the switch 156 of the manual selector 13 as shown in FIG. 3, switch 156 being engageable with grounded contact 158 when the selector is in the heating position.

The manual selector 13 also includes a switch 160 connected by signal line 162 to the gate logic 30 through the inverters 146 and 148 aforementioned. In the "off" position shown, switch 160 engages the contact connected to the low voltage line 96. In the heating and cooling positions, switch 160 engages contacts 164 and 166 respectively connected through conductors 170 and 172 to the collectors of photo sensing transistors 174 and 176 in series with resistors 178 and 180. The photo-sensing transistors 174 and 176 are respectively associated with LEDs 177 and 179 in the sensing section 16. The LEDs also form part of the resistor-diode networks 88 and 90 as shown in FIG. 3. Bias voltages are applied to the collectors of transistors 174 and 176 from the voltage line 96 through resistors 182 and 184, and maintained thereon by grounded capacitors 186 and 188 through the resistors 178 and 180. Signals applied to the bases of the sensing transistors 174 and 176 in the sensor section 16 from the LEDs in the resistor-diode networks 88 and 90 will accordingly be transmitted through contacts 164 and 166 and switch 160 to the demand sensing signal line 162 when the selector 13 is in either the heating or cooling position.

A low voltage demand signal in line 162 will be transmitted through inverters 146 and 148 to trigger line 144 in the gate logic 30, thereby applying inputs to OR gate 150 in the indicator section 34, the reset terminal 140 of the cycle control, a terminal of a presettable up/down counter chip 190 in the timing section 26 and an OR gate 192 in the control logic 30. Trigger line 144 is connected by resistor 194 to the junction between grounded capacitor 196 and inverter 198 coupled to the OR gate 192 so as to apply an input thereto when the demand signal ceases. The OR gate 192 will therefore transmit pulse signals from trigger line 144 during an energy demand cycle in response to detection of a demand signal and upon cessation of the demand signal. The pulse output of OR gate 192 is applied by line 199 to one input of an NAND gate 200 and through inverter 202 to reset terminals of a pulse counter formed by two cascaded 12 stage ripple counter chips 204 and 206 in the timing selection. The clock terminal of counter chip 204 is connected to the output 208 of a pulse generator 210 as shown in FIG. 5, having a power input connected to the 24 VAC input at rectifier terminal 62. The pulse generator develops usable clock pulses 212 of 5 volts and 16 MS duration applied through line 208 to the ripple counters for accurate time keeping purposes in the form of the digital output fed by lines 24 to the cycle control 20 from the counter chip 206. One of the counter output lines 24a is coupled by capacitor 214 and inverter 216 to another input of NAND gate 200. A timed cycle is initiated each time a thermostat switch 74 or 78 closes because of the trigger pulse applied to the ripple counters 204 and 206 from OR gate 192 through inverter 202 to begin a count of the clock pulses applied from the pulse generator 210 to thereby supply timing information to the cycle control 20 with respect to the duration and spacing of the demand signals, through the timing outputs 24.

The demand signal sensing output of the sensing section in line 144 is also applied to a terminal 218 of up/down counter 190 so as to initiate its cyclic operation in accordance with a plurality of fixed jam inputs 220 to establish the constant 18.2 minute cycle duration aforementioned in connection with the timing diagrams of FIGS. 2A and 2B. A change in the counting mode of counter 190 is triggered by an output from NAND gate 200 enabled by the counter output in line 222 applied to one of the inputs of the NAND gate. Such change in mode of counter 190 occurs when enabled NAND gate 200 receives a demand sensing input through line 199 for a period of time following a timing pulse input applied through capacitor 214 to grounded timing capacitor 224 on which a base charge is maintained from the voltage line 96 through resistor 226. The outputs 28 of counter 190 will accordingly dictate the step changes in state of the cycle control 20 within the constant 18.2 minute time frame and the direction of the step changes in accordance with the timed duration of the demand signal inputs from the sensor section 16.

The indicator section 34 includes a LED lamp 228 connected in series with load resistor 230 to the voltage line 96 to conduct when an "off" time signal output is received through OR gate 150. When operating voltage is available in line 96, the LED 232 connected in series with load resistor 234 between line 96 and ground, will conduct. Thus, the LED's 228 and 232 when conducting will provide visual indications of the functioning condition of the system.

The circuitry described with respect to FIGS. 3, 4 and 5 and associated electrical components according to one embodiment of the invention are mounted on a single printed circuit board and housed within a PVC unit enclosure. Access cut-outs are formed in the enclosure for the light emitting diode indicators 227 and 232 and for the manual actuator of the mode selector 13. A multi-wire cable extends from the unit enclosure to establish the circuit connections with the power source and the coils 66 and 68 associated with the heating and cooling equipment.

Having thus described the invention, it will be understood that various changes and modifications may become apparent to persons skilled in the art, all falling within the scope of the invention as encompassed by the claims which follow.

What is claimed is:

1. In combination with at least one device for controlling consumption of energy, a power supply, manual selector means for enabling the device, and condition monitoring means connected to the power supply for operation of the enabled device in response to energy demand, the improvement residing in the management of energy consumption, comprising sensing means responsive to said operation of the enabled device for detecting the energy demand, load control means connected to the power supply for interrupting said operation of the enabled devices by the power supply, programmed cycle control means connected to the load, control means for establishing a plurality of different time dependent interruption cycles causing the load control means to intermittently interrupt said operation of the enabled device initiated by energy demand, timing means connected to the cycle control means for changing the interruption cycles controlling said operation of the enabled device, and logic means operatively connecting the sensing means to the timing means for directionally controlling said change in the interruption cycles in accordance with the duration and absence of the energy demand.

2. The improvement as defined in claim 1 wherein the power supply is enabled by the load control means during each of the interruption cycles of the cycle control means for intervals which vary in duration from a starting value dependent on the directional change in the interruption cycles.

3. The improvement as defined in claim 2 wherein said starting value is 6.84 or 12.54 minutes while the energy consumption controlling device is enabled, each of the cycles having a constant duration of 18.2 minutes.

4. The improvement as defined in claim 3 wherein the intervals during which the power supply is enabled by the load control means increase in duration during the presence of the energy demand from the condition monitoring means and decrease in duration in the absence of the energy demand.

5. The improvement as defined in claim 4 wherein the power supply is disabled by the load control means for an initial period of fixed duration during each of the cycles of the cycle control means while said device is enabled.

6. The improvement as defined in claim 5 wherein the power supply is disabled by the load control means during each of the cycles of the cycle control means for a portion of the constant duration thereof between $12\frac{1}{2}\%$ and $87\frac{1}{2}\%$.

7. The improvement as defined in claim 6 wherein the power supply is disabled between approximately 25% and 50% of each of the cycles while said device is enabled.

8. The improvement as defined in claim 2 wherein the intervals during which the power supply is enabled by the load control means increase in duration during the presence of the energy demand from the condition monitoring means and decrease in duration in the absence of the energy demand.

9. In combination with at least two devices for controlling consumption of energy, a power supply, manual selector means for alternately enabling the two devices, and condition monitoring means connected to the power supply for operation of the enabled devices in response to energy demand, the improvement residing in the management of energy consumption, comprising sensing means responsive to said operation of the enabled devices for detecting the energy demand, load control means connected to the power supply for interrupting said operation of the enabled devices by the power supply, programmed cycle control means connected to the load control means for establishing a plurality of different interruption cycles during which the load control means intermittently interrupts said operation of the enabled devices initiated by energy demand, timing means connected to the cycle control means for changing the interruption cycles controlling said operation of the enabled devices, and logic means operatively connecting the sensing means to the timing means for directionally controlling said change in the interruption cycles in accordance with the duration of the energy demand, said power supply including a relatively high voltage source connected across each of the devices in series with the condition monitoring means, and voltage converting means connected by the manual selector means in series with the devices for producing a relatively low voltage ttiggering signal fed to the timing means by the sensing means in response to said detection of the energy demands.

10. The improvement as defined in claim 9 including indicator means connected to the programmed cycle control means for registering the intermittent interruptions.

11. The improvement as defined in claim 10 wherein the timing means includes a pulse generator connected to the high voltage source, a pulse counter driven by the pulse generator and having a plurality of timing outputs connected to the cycle control means, an up/down counter having a plurality of cycle selecting outputs connected to the cycle control means and a direction selecting input connected by the logic means to one of the timing outputs of the pulse counter, and means connected to the up/down counter for establishing a constant cycle duration for the different interruption cycles.

12. The improvement as defined in claim 11 wherein the logic means includes an OR gate having a trigger output connected to the pulse counter and a pair of inputs, means coupling one of the inputs of the OR gate to the sensing means for initiating a counting operation in response to the detection of the energy demand, signal inverting means connecting the other of the inputs of the OR gate to the sensing means for producing a timing pulse in response to cessation of the energy demand, and a NAND gate connected to the direction selecting input of the timing means, the NAND gate having inputs respectively connected to said one of the timing outputs of the pulse counter and the trigger output of the OR gate.

13. The improvement as defined in claim 12 wherein the cycle control means comprises a programmable memory component having a plurality of inputs to which the timing means is connected, at least two outputs respectively connected to the load control means and the indicator means and a reset terminal connected to said one of the inputs of the OR gate of the logic means.

14. The improvement as defined in claim 13 wherein the indicator means includes a light emitting device and a second OR gate, the second OR gate having an output coupled to the light emitting device and a pair of inputs respectively connected to one of the outputs and the reset terminal of the cycle control means.

15. The improvement as defined in claim 14 wherein the load control means includes a load-controlling transistor having a grounded emitter, a collector connected to the voltage converting means and a signal controlled base, and means connecting one of the outputs of the programmable memory component of the cycle control means to the base of the transistor for intermittent switching thereof between conductive and non-conductive states in accordance with said different interruption cycles.

16. The improvement as defined in claim 15 wherein the transistor is maintained in the non-conductive state to enable the power supply during each of the interruption cycles for intervals which vary in duration from a starting value dependent on the directional change in the interruption cycles.

17. The improvement as defined in claim 16 wherein the non-conductive intervals of the transistor increase in duration during the presence of the energy demand from the conditioning monitoring means and decrease in duration in the absence of the energy demand.

18. The improvement as defined in claim 17 wherein the transistor is maintained in the conductive state for an initial period of fixed duration during each of the interruption cycles to interrupt operation of one of the enabled devices.

19. The improvement as defined in claim 18 wherein each of the interruption cycles has a single one of the intervals during which the transistor is in the non-conductive state to maintain operation of said one of the enabled devices.

20. The improvement as defined in claim 19 wherein each of the interruption cycles has at least two of the non-conductive intervals spaced from each other to support operation of the other of the enabled devices.

21. The combination of claim 20 wherein said energy consumption controlling devices respectively control heating and cooling operations and the condition monitoring means are thermostat controls.

22. The improvement as defined in claim 21 wherein the constant duration of the interruption cycles is approximately 18 minutes.

23. The improvement as defined in claim 22 wherein the transistor is maintained in the conductive state during each of the interruption cycles for a portion of the constant duration between $12\frac{1}{2}\%$ and $87\frac{1}{2}\%$.

24. The improvement as defined in claim 9 wherein the timing means includes a pulse generator connected to the high voltage source, a pulse counter driven by the pulse generator and having a plurality of timing outputs connected to the cycle control means, an up/down counter having a plurality of cycle selecting outputs connected to the cycle control means and a direction selecting input connected by the logic means to one of the timing outputs of the pulse counter, and means connected to the up/down counter for establishing a constant cycle duration for the different interruption cycles.

25. The improvement as defined in claim 24 wherein the logic means includes an OR gate having a trigger output connected to the pulse counter and a pair of inputs, means coupling one of the inputs of the OR gate to the sensing means for initiating a counting operation in response to the detection of the energy demand, signal inverting means connecting the other of the inputs of the OR gate to the sensing means for producing a timing pulse in response to cessation of the energy demand, and a NAND gate connected to the direction selecting input of the timing means, the NAND gate having inputs respectively connected to said one of the timing outputs of the pulse counter and the trigger output of the OR gate.

26. In combination with at least two devices for controlling consumption of energy, a power supply, manual selector means for alternately enabling the two devices, and condition monitoring means connected to the power supply for operation of the enabled devices in response to energy demand, the improvement residing in the management of energy consumption, comprising sensing means responsive to said operation of the enabled devices for detecting the energy demand, load control means connected to the power supply for interrupting said operation of the enabled devices by the power supply, programmed cycle control means connected to the load control means for establishing a plurality of different interruption cycles during which the load control means intermittently interrupts said operation of the enabled devices initiated by energy demand, timing means connected to the cycle control means for changing the interruption cycles controlling said operation of the enabled devices, logic means operatively connecting the sensing means to the timing means for directionally controlling said change in the interruption cycles in accordance with the duration of the energy demand, and indicator means connected to the programmed cycle control means for registering the intermittent interruptions, the cycle control means comprising a programmable memory component having a plurality of inputs to which the timing means is connected, at least two outputs respectively connected to the load control means and the indicator means and a reset terminal connected to said logic means.

27. In combination with an energy consumption controlling device and a power supply connected thereto for energization thereof in response to energy demand, the improvement residing in the management of energy consumption, comprising sensing means for detecting the energy demand, load control means connected to the power supply for disabling the consumption controlling device, cycle control means connected to the load control means for establishing a plurality of different cycles causing the consumption controlling device to be intermittantly disabled, timing means connected to the cycle control means for limiting the cycles to a constant duration, and logic means operatively connecting the sensing means to the timing means and the cycle control means for changing the cycles in accordance with the duration and absence of the energy demand.

28. The improvement as defined in claim 27 wherein the cycle control means includes memory means programmed to produce the changing sequences of cycles causing the power supply to be intermittantly disabled for periods of decreasing duration in response to the detection of the energy demand by the sensing means and for periods of increasing duration in response to cessation of the energy demand.

29. The combination of claim 28 where the energy consumption controlling device comprises thermostatically controlled means for operating heating and air conditioning systems.

30. In combination with energy consuming equipment, a source of operating energy for said equipment and means connected to the source and producing demands for the energy to operate said equipment, the improvement comprising sensing means for detecting the presence and absence of the energy demands, timing means operatively connected to the sensing means for measuring the duration of and spacing between the detected energy demands, and time dependent programmed means operatively connected to the timing means and the source for intermittently interrupting the supply of operating energy to the equipment during the presence of the energy demands and prolonging the supply of operating energy upon cessation of the energy demands in accordance with the duration of the energy demands detected by the sensing means.

31. The improvement as defined in claim 30 wherein said programmed means includes cycle controlling memory means for producing a sequence of constant duration cycles during which the supply of operating energy is initially delayed for fixed periods of time and progressively increased in duration in the presence of the energy demands or decreased in duration in the absence of the energy demands.

32. The improvement as defined in claim 30 wherein said programmed means includes cycle controlling memory means for producing a sequence of constant duration cycles during which the supply of operating energy is progressively increased in duration in the presence of the energy demands or decreased in duration in the absence of the energy demands.

33. The improvement as defined in claim 32 wherein the supply of operating energy is interrupted each cycle with progressively increased frequency during the presence of the energy demands and decreased frequency during the absence of the energy demands.

34. The combination of claim 30 wherein the equipment includes a coolant compressor and a heat generator, and mode selector means for alternately enabling the compressor and the heat generator in response to the energy demands, the programmed means including cycle controlling memory means for producing two sequences of constant duration cycles during which the supply of operating energy is progressively increased in duration in the presence of the energy demands or decreased in the absence of the energy demands, and means connecting the mode selector means to the memory means for rendering the programmed means operative to produce only one of the two sequences of cycles.

35. The improvement as defined in claim 34 wherein the supply of operative energy is initially delayed for fixed periods of time each cycle when one of the two sequences of cycles is in operation to protect the compressor against short cycling and the supply of operating energy is interrupted each cycle at a progressively changing frequency when the other of the two sequences of cycles is in operation.

36. The combination of claim 30 wherein the source of operating energy includes a power transformer having an AC output winding and rectifying converter means operatively connecting the output winding to the energy consuming equipment for supplying the operating energy thereto, the improvement further including load control means operatively connecting the programmed means to the rectifying converter means for intermittent unloading thereof to interrupt the supply of operating energy.

37. The improvement as defined in claim 36 wherein said load control means includes a current control device responsive to signals from the programmed means for grounding the converter means.

38. The improvement as defined in claim 37 including voltage regulating means connected to the converter means for continuous operation of the programmed means during the supply of operating energy by the converter means and when unloaded by the load control means.

39. The improvement as defined in claim 36 including voltage regulating means connected to the converter means for continuous operation of the programmed means during the supply of operating energy by the converter means and when unloaded by the load control means.

* * * * *